United States Patent
Galli et al.

(10) Patent No.: US 9,500,279 B2
(45) Date of Patent: Nov. 22, 2016

(54) PISTON WITH ACTIVE STRUCTURE

(71) Applicants: Luis Antonio Fonseca Galli, Campinas (BR); Alex de Souza Rodrigues, Jundiai (BR); Rafael Augusto Lima E Silva, Campinas (BR); Robson Cruz, Campo Limpo (BR)

(72) Inventors: Luis Antonio Fonseca Galli, Campinas (BR); Alex de Souza Rodrigues, Jundiai (BR); Rafael Augusto Lima E Silva, Campinas (BR); Robson Cruz, Campo Limpo (BR)

(73) Assignee: THYSSENKRUPP METALURGICA CAMPO LIMPO LTDA. (BR)

( * ) Notice: Subject to any disclaimer, the term of this patent is extended or adjusted under 35 U.S.C. 154(b) by 283 days.

(21) Appl. No.: 14/390,744

(22) PCT Filed: Apr. 5, 2013

(86) PCT No.: PCT/IB2013/000621
§ 371 (c)(1),
(2) Date: Oct. 3, 2014

(87) PCT Pub. No.: WO2013/150370
PCT Pub. Date: Oct. 10, 2013

(65) Prior Publication Data
US 2015/0114218 A1  Apr. 30, 2015

(30) Foreign Application Priority Data
Apr. 5, 2012 (EP) .................................... 12163365

(51) Int. Cl.
*F16J 1/20* (2006.01)
*F16J 1/22* (2006.01)
(Continued)

(52) U.S. Cl.
CPC .. *F16J 1/22* (2013.01); *F02F 3/00* (2013.01); *F02F 3/0076* (2013.01); *F16J 1/001* (2013.01); *F16J 1/20* (2013.01)

(58) Field of Classification Search
CPC .................. F16J 1/20; F16J 1/22; F02F 3/00
USPC ........................................................... 92/187
See application file for complete search history.

(56) References Cited

U.S. PATENT DOCUMENTS 1,756,761 A * 4/1930 Reid .......................... F16J 1/14
403/25

(Continued)

FOREIGN PATENT DOCUMENTS

| EP | 1983232 A1 | 10/2008 |
|---|---|---|
| JP | 2000/065205 A | 3/2000 |
| WO | 2009006650 A1 | 1/2009 |

OTHER PUBLICATIONS

International Search Report for International patent application No. PCT/IB2013/000621; mailing date Jul. 11, 2013.

(Continued)

*Primary Examiner* — Thomas E Lazo
(74) *Attorney, Agent, or Firm* — thyssenkrupp North America, Inc.

(57) ABSTRACT

The present invention relates to a piston and a piston—connecting rod assembly for internal combustion engines or compressors, featuring a pinless connecting rod assembly having a joint claw, whereas the joint claw is formed to partly encompass an upper joining end of a connecting rod, whereas the joint claw is formed as a part of an inner section of the piston, and whereas the inner section is radially encircled by a cylindrical piston skirt. According to the invention at least one bar element is arranged extending between the inner section and the piston skirt, whereas the bar element divides a first open section from at least one second open section being arranged between the inner section and the piston skirt.

14 Claims, 3 Drawing Sheets

(51) Int. Cl.
*F02F 3/00* (2006.01)
*F16J 1/00* (2006.01)

(56) References Cited

U.S. PATENT DOCUMENTS

| | | | | | |
|---|---|---|---|---|---|
| 3,564,978 | A | * | 2/1971 | Flitz | F16J 1/14 403/152 |
| 3,765,307 | A | * | 10/1973 | Neel, Jr. | F02F 3/00 403/152 |
| 3,877,350 | A | * | 4/1975 | Earley | F16J 1/16 403/152 |
| 3,903,752 | A | * | 9/1975 | Riffe | F04B 53/144 123/193.2 |
| 5,492,052 | A | * | 2/1996 | Junge | F16J 1/14 74/579 E |
| 6,526,847 | B1 | * | 3/2003 | Yaroslavtsev | F16J 1/22 74/579 R |
| 7,127,981 | B2 | * | 10/2006 | Endoh | F16J 1/22 92/165 PR |
| 8,100,048 | B2 | * | 1/2012 | Christopher | F16J 1/14 92/187 |
| 2009/0084260 | A1 | | 4/2009 | Christopher | |

OTHER PUBLICATIONS

English translation of the abstract of JP20001065205(A).

* cited by examiner

PISTON WITH ACTIVE STRUCTURE

CROSS-REFERENCE TO RELATED APPLICATIONS

This applciation is a U.S. National Stage Entry of International Patent Application Ser. No. PCT/IB2013/000621, filed Apr. 5, 2013, which claims priority to European patent application no. 12163365.5, filed Apr. 5, 2012.

FIELD

The present invention relates to a piston for internal combustion engines or compressors having a pinless connecting rod assembly having a joint claw, whereas the joint claw is formed to partly encompass an upper joining end of a connecting rod, whereas the joint claw is formed as a part of an inner section of the piston, and whereas the inner section is radially encircled by a cylindrical piston skirt.

BACKGROUND

The piston effectively forms a pressure tight plunger sliding up and down the cylinder and the piston features a piston skirt, whereas the outer surface of the skirt slides along the cylinder running surface in a longitudinal axis corresponding to the longitudinal axis of the piston. In its center area the piston features an inner section and a piston surface on top of the piston body, which limits the combustion chamber and forms a continuous transition area to the upper area of the piston skirt, whereas a piston crown bowl is arranged in the topography of the top surface and is a part of the transition area. In the lower end the inner section crosses over into the joint claw which is part of the connecting rod assembly and the connecting rod is linked to the piston by means of negative locking dispensing a piston pin.

The piston converts the pressure provided by the combustion process into a reciprocating mechanical movement. By connecting the reciprocating piston to a crankshaft with a connecting rod, the reciprocating movement is converted into rotational movement of the crankshaft. The connecting rod connects the piston to the crankshaft, and the connecting rod is therefore subject to high forces exerted on the piston by the combustion pressure. When the combustion pressure forces the piston down the cylinder, the connecting rod must transfer the force through to the rotating crankshaft.

Some regions or parts of the piston are therefore subject to different mechanical forces and loads leading to corresponding mechanical expansion and/or retraction in the piston skirt. The piston skirt forms one of said regions and/or parts which are influenced by the forces and loads, and the skirt is an element that forms a downward tubular body below a ring belt and is usually used for internal combustion engines having a high power stroke. To allow the piston to run free in the cylinder, the piston should, for example, have a small clearance to the running surface of the cylinder. In particular pinless pistons are influenced in its expansion and/or retraction behavior in an outstanding manner due to the central force transmission from the connecting rod into the piston, which leads to the necessity of a special piston design.

In the prior art, a piston is joined by using a transversal pin, which transmits the load from the piston to the connecting rod and assures a relative movement in between. The load transmission happens from the piston to the pin and then from the pin to the connecting rod. Taking into account this arrangement, there is a connecting rod cylindrical surface in contact to a pin cylindrical surface, which produces sliding movements during the working process.

Since high loads rise by the combustion adjacent to the piston crown, this generates mechanical expansion of piston skirt, where transversal force components affect said piston skirt and cause strains to the piston body. In course of time, these loads can cause high wear and increase the friction forces of the piston in operative interconnection with the cylinder.

Document U.S. Pat. No. 3,765,307 A describes a piston for a pinless assembly in which the piston base is designed with a transverse open slot allowing the connecting rod a reciprocating movement in operative interconnection with the crankshaft. The connection between the piston and the connecting rod is provided directly by a concave open surface in the piston centre and a convex cylindrical surface at the small end of the connecting rod. Two open bores are provided diametral in the piston body, being those bores located in the opposite, extending parallel to the longitudinal axis of the piston and the only function of these bores is to reduce the weight of the piston.

Document JP 2000/065205 A describes a piston with a structure to connect the piston with a connecting rod of the piston without making use of a piston pin, maintaining the high rigidity of the piston and facilitating the connection between the piston and the connecting rod. The piston described has an out jutting part of the piston body having an enlarged tip end. The piston is connected to the connecting rod by use of said jutting part, and there is no need to provide a stopper for the insertion of the piston, and whereby the need of a hollow part in the piston is avoided. By means of the jutting part the connecting rod is linked to the piston by means of negative locking dispensing a piston pin. The piston connecting structure leads to a negative deformation behavior upon high loads from the connecting rod into the piston.

Document EP 1 983 232 A1 describes a crankshaft drive for internal combustion engines and compressors having a piston and an arrangement to a connecting rod. The connecting rod is linked to the piston by means of positive locking means. The connecting rod and the piston have integrated positive locking elements engaged to each other, preferably arranged in the main load direction of the connecting rod. The connecting rod represents a swivel on the piston-facing end with an external circumferential curve contour where a joining end shell is located towards the back of the piston.

Document US 2009/0084260 A1 describes a piston for a pinless assembly with cavities in the piston that form mirrored piston halves, these cavities being perpendicular to the annular pocket receiving the small bearing end of the connecting rod and extending from the base of the piston skirt to the piston crown. The small end can be provided with an external bearing material on a convex outer surface, and the small end is unobstructed from lateral movement along the opening over a full stroke of the piston.

A common disadvantage of known piston designs performed for a pinless assembly to the connecting rod in the prior art rises due to a specific deformation behavior in the piston structure upon the combustion load on the top of the piston limiting the combustion chamber and in particular upon the force transmission from the connecting rod into the joint claw and thus into the inner section of the piston. The periodic deformation of the piston structure in the active use of the piston fulfilling a reciprocating stroke movement leads to a detrimental influence on the clearance between the piston skirt and the cylinder running surface.

SUMMARY

Thus, the invention has the objective to eliminate the above mentioned disadvantages rising in the prior art designs of known pistons. In particular it is an objective of the present invention to provide a weight optimized pinless piston with an improved structural design for an optimized load behavior of the piston skirt in use of the piston, in order to minimize the friction between the piston and the cylinder.

BRIEF DESCRIPTION OF THE DRAWINGS

The present invention is described in detail below with reference to the attached drawing figures, wherein.

DETAILED DESCRIPTION

Figure 1:
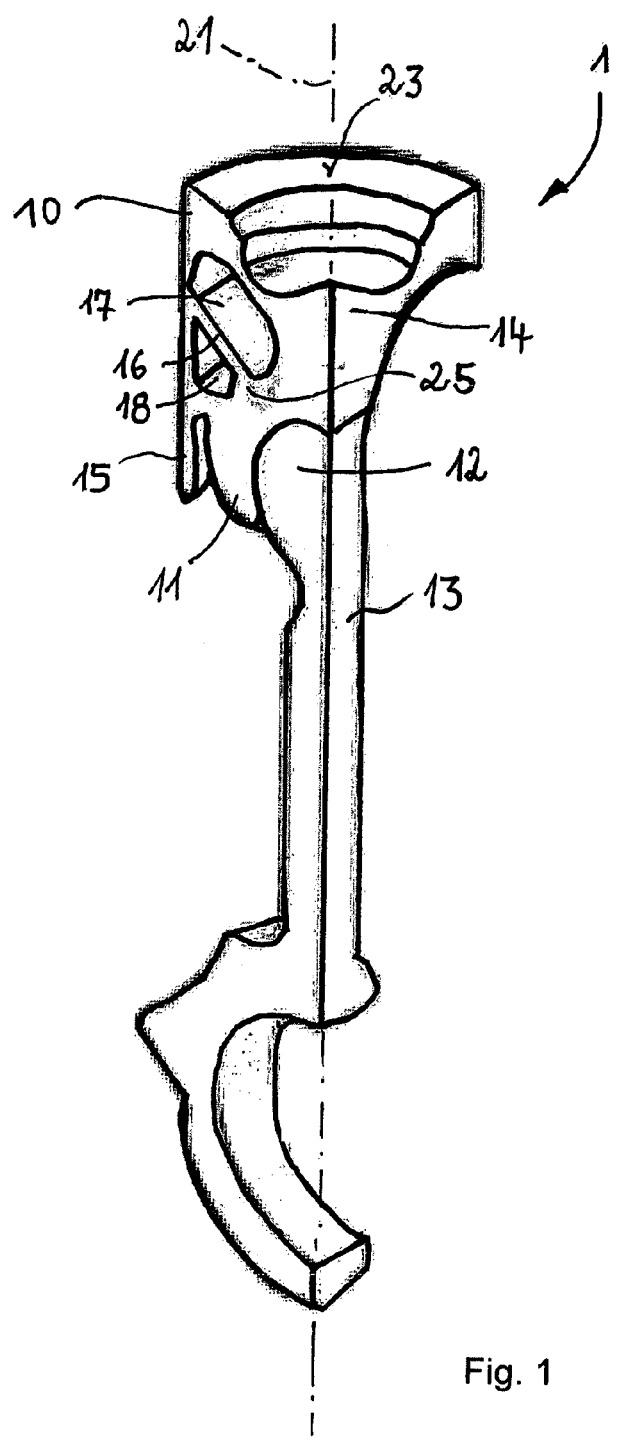
FIG. 1 is a cross-section isometric view of an embodiment of a piston-connecting rod assembly with a pinless piston connected to a connecting rod, as presently disclosed herein.

The invention discloses that at least one bar element is arranged extending between the inner section and the piston skirt, whereas the bar element divides a first open section from at least one second open section being arranged between the inner section and the piston skirt.

In the sense of the invention the bar element forms at least one further transition part between the inner section of the piston and the piston skirt next to the continuous transition on top of the piston forming the piston top surface. Thus, a further interconnection between the inner section of the piston and the piston skirt is formed by a discrete arranged bar element.

By applying said bar element between the inner section and the piston skirt the present invention teaches a way to improve the load behavior of the piston skirt by forming an active structure that is applied to the piston design. The bar element provides means for redistribution of the load path applied to the piston during the combustion pressure loading the top surface of the piston and prevents unwanted mechanical deformation of the piston skirt. The active structure describes an inner piston structure including the bar element that lead to an advantageous deformation in the piston shirt in case of compressive loads as well as in case of tensile loads from the connecting rod on the piston. An advantageous piston skirt deformation as a reaction on a compressive load or a tensile load occurs when the piston skirt reduces the diameter or at least when the diameter of the piston skirt does not expand. This behavior leads to a reduced friction and a reduced wear in the clearance between the piston skirt and the cylinder.

The piston for a pinless connecting rod assembly comprises an active influenced moving behavior of the piston body and according to the invention the piston comprises a geometry of at least a first and a second open section, and each open section can be described as an orifice and/or as a chamber. The piston performance is improved through the redistribution of the load path applied to the piston. Thus, according to the invention an advantageous load path is provided for the stress within the piston body occurring under compressive loads or under tensile loads from the connecting rod.

The piston body deformations are improved due to the permission of piston parts and/or regions of the piston to be periodically reduced in diameter upon the periodic combustion load. This improved behavior of the piston body is performed by the bar element leading to a reduction of friction between the piston and the cylinder. This reduced friction leads to a reduced wear and to a reduced power loss. But the reduction of the piston skirt diameter is limited to an amount that does not lead to a negative influence on the at least one piston ring. In particular, the clearance between the piston skirt and the running surface of the cylinder is not influenced negatively when the force distribution in the piston body is influenced by said bar element.

In a preferred embodiment, the piston skirt "closes" under tensile loads from the connecting rod, what means that the piston skirt does at least not expand the diameter and the piston has a lower weight leading to a reduced power loss due to a lower moving mass and the open sections forming said orifices and/or chambers provide cooling effects in the piston.

According to another preferred embodiment the joint claw features at least one connecting section for connecting the joint claw to the piston skirt, preferably the joint claw and the bar element are arranged for encircling the second open section. The connecting section crosses over into the piston skirt in an arrangement below the second open section. In particular the connecting section forms a flexure hinge between the joint claw and the piston skirt. The movements in the flexure hinge upon loads from the connecting rod relate to small tilting or tipping movements between the joint claw, in particular the half of the joint claw, and the piston skirt. Consequently, the connecting section is a part of the active structure in the piston body, whereas the active structure with the bar element, the first and the second open section and the connecting section is arranged twice in a mirrored situation on a left and a right side of the inner piston section.

According to yet another embodiment of the invention the bar element features an orientation in an angle of 10° to 80°, preferred 30° to 60° and most preferred 45° with reference to the central longitudinal axis of the piston. The lower end of the bar element is attached to the inner section and the upper end of the bar element is attached to the inner wall of the piston skirt.

It is another advantage of the inventive active structure when the bar element is coupled to the inner section in a transition section between the joint claw and a main part of the inner section. Thus, movements in the flexure hinge between the joint claw and the piston skirt like small tilting or tipping movements influence the coupling of the bar element to the inner section. Due to the coupling of the bar element micromovements in the transition section lead to a retraction of the bar element towards the inner section both in case of a compressive load and in case of a tensile load from the connecting rod onto the piston. As a result, in any case the piston skirt does not expand its diameter.

With reference to the top piston surface limiting the combustion chamber and forming the top of the piston and with reference to the central longitudinal axis the first open section can be arranged above the bar element and the bar element can be arranged above the at least one second open section and preferably the second open section can be arranged above the connecting section between the joint claw and the piston skirt. The entire design of the active structure is not limited to only one bar element between a first and a second open section and in the spirit of the invention more than one bar element can be arranged between the inner section of the piston and the piston skirt lying upon each other. Thus, more than two open sections can be arranged and can be divided by more than one bar element.

According to another improvement of the invention the arrangement of the at least one bar element, the first open section and the at least one second open section and preferably the connecting section are each formed mirrored on two opposite sides relative to the inner section between said inner section and the piston skirt. This design leads to a bilateral symmetric arrangement of active structures between the inner section and two areas of the piston skirt arranged diametral to each other. In particular the diametral arrangement of the active structures corresponds to the diametral arrangement of the two halves of the joint claw receiving the connecting rod. This leads to a free space between the piston skirt and the inner section of the piston beside the active structures, which free space is necessary for a sidewise fitting the connection rod into the joint claw.

The at least one bar element is performed for interacting with the piston skirt causing an expansion and/or retraction of the piston skirt upon mechanical load on the piston. In particular, the at least one bar element is performed for interacting with the piston skirt causing a retraction of at least a part of the piston skirt upon a compressive load and/or upon a tensile load on the piston via the connecting rod.

Another improvement of the present invention bases on a bar element that is conjoined to the piston skirt in the region between ¼H and ¾H of the piston height and preferred in the region of the medial height ½H of the piston with reference to the central longitudinal axis, whereas the top of the piston is defined as being the base height OH. The medial height forms the most stressed section of the piston skirt over the entire piston height and the bar element is attached to the inner wall of the piston skirt in said medial area leading to the best result in retracting the piston skirt towards the inner section of the piston.

It is another improvement of the piston design when the piston body is formed in a one piece construction comprising at least the inner section with the joint claw, the piston skirt and bar element, whereas the piston body preferably is made by casting technology. According to another advantage the piston body can be made of discrete piston parts, and the piston parts can be manufactured by use of forging technology.

With another advantage between the joint claw and the lower end of the piston skirt a recess can be arranged for decoupling the deformation of the joint claw from the piston skirt. In particular when the load from the connecting rod onto the joint claw forms a tensile load, the lower end of the joint claw is stressed in a way that the lower end deforms to the outside and thus towards the piston skirt. In order to avoid an elastic expansion of the piston skirt to the outside, the joint claw and the lower end of the piston skirt is geometrically decoupled by said recess.

The objection of the present invention is also achieved by a piston-connecting rod assembly for a crankshaft drive for internal combustion engines or compressors having a piston and a connecting rod featuring a pinless connecting rod assembly having a joint claw, which is formed to partly encompass an upper joining end of a connecting rod, whereas the joint claw is formed as a part of an inner section of the piston, and whereas the inner section is radially encircled by a cylindrical piston skirt, whereas according to the invention at least one bar element is arranged extending between the inner section and the piston skirt, whereas the bar element divides a first open section from at least one second open section being arranged between the inner section and the piston skirt. The features, further embodiments and advantages of the inventive piston as disclosed above are also applicable to the piston-connecting rod assembly as herewith disclosed.

The inventive concept in common with the objects of the invention is to provide means for advantageous expansion and/or retraction of solid parts/regions of a piston in response to mechanical loads, in particular the means for expansion and/or retraction upon load is herein referred to as "active technology", and the piston structure itself allowing for such desired advantageous expansion and/or retraction being herein referred to as an "active structure". The present invention therefore provides a piston for a piston-connecting rod assembly and an analogous piston-connecting rod assembly comprising the "active technology" used for internal combustion engines and compressors.

Prior art pistons may be made of aluminum and the cylinder walls are made of iron, so the piston expands more quickly than the cylinder during engine operation due to friction and consequently piston heating. The present invention provides a solution to this problem by compensating piston expansion that would otherwise negative influence the clearance between the piston skirt and the cylinder.

The aforementioned components as well as the claimed components and the components to be used in accordance with the invention in the described embodiments are not subject to any special exceptions with respect to their size, shape, material selection and technical concept such that the selection criteria known in the pertinent field can be applied without limitations.

FIG. 1 shows a piston-connecting rod-assembly 1 with a pinless piston 10 and with a connecting rod 13, and the piston 10 is shown in a quarter of the entire piston 10 and the connecting rod 13 is shown in a half of the entire connecting rod 13. The piston-connecting rod assembly 1 can be a part of a crankshaft drive for a combustion engine or for a compressor. The pinless interconnection between the piston 10 and the connecting rod 13 features a joint claw 11, whereas the joint claw 11 is formed to partly encompass the upper joining end 12 of the connecting rod 13. The joint claw 11 is formed as a part of an inner section 14 of the piston 10, whereas the inner section 14 is radially encircled by a cylindrical piston skirt 15. The piston 10 limits a combustion chamber of the combustion engine or the compressor and features a piston surface 23 on top of the piston 10. With the—not shown—crankshaft and the connecting rod 13 the piston 10 performs a reciprocating stroke movement in the cylinder of the engine or the compressor.

Between the inner section 14 and the piston skirt 15 extends a bar element 16, and the bar element 16 divides a first open section 17 from a second open section 18 also being arranged between the inner section 14 and the piston skirt 15. The bar element 16 features an orientation in an angle of 45° with reference to the central longitudinal axis 21 of the piston 10, and the bar element 16 is attached to the inner wall of the piston skirt 15 at its outer end and to the inner section 14 at its inner end. In particular, the bar element 16 is attached to the inner section 14 in the transition section 25, where the inner section 14 crosses over into the joint claw 11.

The piston 10 according to the invention provides several technical advantages due to the use of the bar element 16 and the open sections 17 and 18 leading to a reduction of inertial mass of the piston 10 and leading to a reduction of material use for manufacturing the piston 10 and the connecting rod 13. Another advantage is the downsizing of the total mechanical system of the crankshaft system a smaller clearance between the piston 10 and the cylinder, a reduction of slip on movements between the piston 10 and the connecting rod 13, and an optimized elastic-deformation behavior of the piston 10 leads to a lower wear of the piston 10. In particular, the active structure between the inner section 14 and the piston skirt 15 leads to a "closing" of the piston skirt 15 under compressive loads and/or under tensile loads, in particular when the piston-connecting-rod-assembly 1 is performed without a piston pin. The principal of the active structure is shown in more detail in conjunction with FIG. 2.

Figure 2:
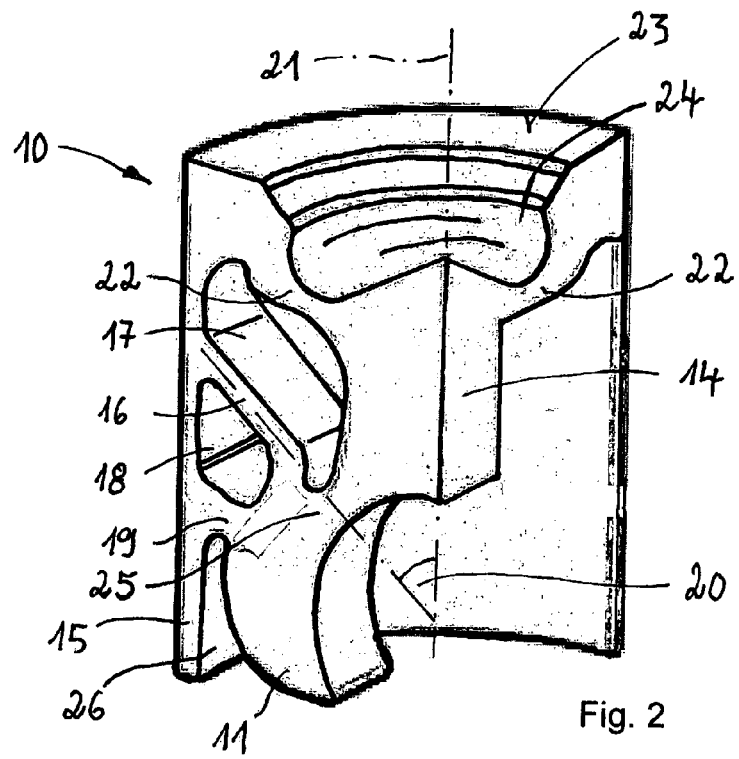
FIG. 2 is a cross-section isometric detail view of the embodiment of the piston of FIG. 1.

FIG. 2 shows a more detailed view of a quarter of the piston 10 sectioned in the central longitudinal axis 21. The piston 10 features a piston surface 23 on top of the piston 10, which limits the combustion chamber. In the piston surface 23 is arranged a piston crown bowl 24, and the bottom of the piston crown bowl 24 forms a transition area 22 between the piston skirt 15 and the inner section 14. According to the invention another connection between the inner section 14 and the piston skirt 15 forms the bar element 16, and the bar element 16 extends in an angle 20 of approximately 45° relative to the central longitudinal axis 21. The inner section 14 crosses over into the joint claw 11 in a transition section 25, and the inner end of the bar element 16 is attached to the inner section 14 in the transition section 25. The joint claw 11 is attached to the piston skirt 15 in a connecting section 19, and below the connecting section 19 extends a lower end of the piston skirt 15. Between the joint claw 11 and the piston skirt 15 is arranged a recess 26 which decouples the piston skirt 15 from the joint claw 11.

The embodiment shows an active structure between the inner section 14 and the piston skirt 15 featuring a first open section 17, which is arranged above the bar element 16 and the bar element 16 is arranged above a second open section 18 and preferably the second open section 18 is arranged above the connecting section 19 lying upon each other with reference to a piston surface 23 limiting the combustion chamber and forming the top of the piston 10. Upon a load on the joint claw 11 from the connecting rod 13 the different sections of the piston 10 feature a displacement behavior which optimizes the extension and/or retraction behavior of the piston skirt 15.

Figure 3:
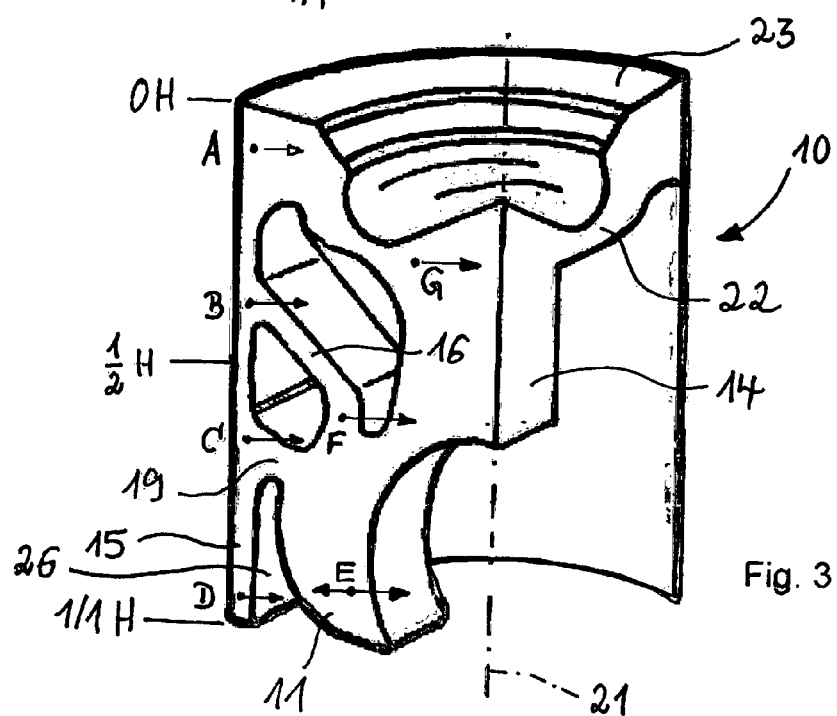
FIG. 3 is a cross-section isometric detail view of the embodiment of the piston of FIG. 1 showing displacement spots A-G representing discrete displacements upon compressive or tensile load from the connecting rod on the piston.

FIG. 3 shows the piston 10 extending along the central longitudinal axis 21, and at the piston surface 23 forming the top of the piston 10 the height of the piston is defined as being the base height 0H. The lower end of the piston skirt 15 defines the entire height of the piston 10 and is indicated as 1/1 H. The medial height is indicated as ½ H.

In the cross section of the quarter part of the piston 10 depictured in FIG. 3 are defined several displacement spots A-G representing the displacement of described areas of the active structure of the piston 10 and in particular of the piston skirt 15. The displacement spots A-D represent displacement areas in the piston skirt 15, the displacement spot E represents the displacement of the joint claw 11, the displacement spot F represents the displacement of the transition of the bar element 16 crossing over into the inner section 14 and the displacement spot G represents the displacement of the inner section 14 neighboring the transition area 22.

In case of a compressive load from the—not shown—connecting rod, each of the displacement spots A, B, C and D performs a positive displacement as indicated with arrows, and the positive displacement describes a displacement of the piston skirt 15 towards the central longitudinal axis 21. The displacement spots E, F and G also show a displacement with a positive displacement direction towards the axis 21. In particular the compressive load from the connecting rod to the piston 10 represents at least the combustion stroke and the compression stroke as well as the discharging stroke of the gas changing cycle of a four-stroke-engine.

Upon an tensile stroke from the connecting rod on the piston, which represents the intake stroke, the displacement spots A, B, C, D, F and G also feature a positive displacement behavior towards the central longitudinal axis 21, but the displacement spot E features a negative displacement leading to an extension of the joint claw 11 against the piston skirt. But due to the recess 26 between the joint claw 11 and the lower end of the piston skirt 15, the piston skirt 15 does not follow the movement of the joint claw 11 in the negative direction.

As a result due to the special design of the active structure with the bar element 16 and the first and second open sections 17 and 18 the piston skirt "closes" under tensile loads as well as under compressive loads. In particular when the joint claw 11 is stressed under a tensile load from the connecting rod and when the joint claw 11 performs a movement in the negative direction towards the piston skirts 15, the joint claw 11 performs a tilting movement in the connection section 19. This tilting movement leads to a tensile stress of the bar element 16 leading to a positive displacement of the displacement spot B. Due to the special shape of the piston crown bowl 24 combined with the transition area 22 between the inner section 14 and the piston skirt 15, the displacement spot A performs a positive displacement towards the central longitudinal axis 21.

Accordingly, the special design of the active structure with a bar element 16, the first and second open sections 17 and 18 as well as the transition area 22 and the connecting section 19 between the joint claw 11 and the piston skirt 15 an expansion of the inner section 14, in particular an expansion of the joint claw 11, does not lead to an expansion of the piston skirt 15. This leads to a decoupling of the inner section 14 from the piston skirt 15, and in particular in both cases, namely when the joint claw 11 is stressed under compressive loads and under tensile loads, the piston skirt 15 "closes", and the closing behavior represents a reduction of the diameter of the piston skirt 15 in the range of several microns. This "closing"-behavior leads to an improved friction between the piston skirt 15 and the cylinder of the engine. This reversed skirt movement leads to a reduced skirt wear and to a reduced cylinder wear. Moreover, the piston 10 is reduced in weight.

Figure 4:
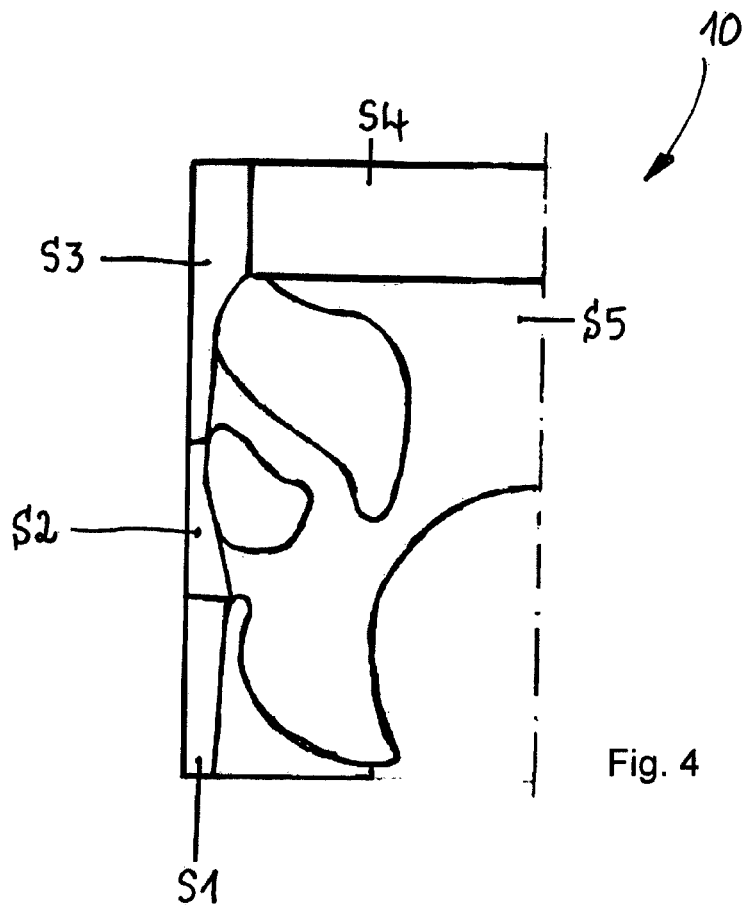
FIG. 4 is a side cross-section detail view of the piston of FIG. 1, which piston is assembled according to a first assembling embodiment.

FIG. 4 represents the piston 10 with different piston sections S1-S5, and the piston S1 represents the lower part, the piston section S2 represents the medial part and the piston section S3 represents the upper part of the piston skirt 15. The piston section S4 represents the piston head and the piston section S5 represents the piston core, forming the active structure in conjunction with S1 to S3.

The embodiment of the piston can be assembled by welding the piston section S1 to the piston section S2, e.g. by means of laser welding. In a next step the piston section S2 can be weld to the piston section S5, e.g. by means of laser welding. In a subsequent step the piston section S3 can be joint to the piston section S2 and after the arrangement of the piston section S3 adjacent to the piston sections S2 and S5 the piston section S3 is weld to the piston section S2 and to the piston section S5. Finally, the piston section S4 is arranged within the opening of piston section S3, and the interconnection between the piston section S4 and the piston section S3 can be performed by friction welding. After welding the piston section S4 is weld to the piston section S5 by laser welding.

Each of the piston section can be made by forging, in order to optimize the load capacity of the piston 10 due to the high material resilience of forged parts.

Figure 5:
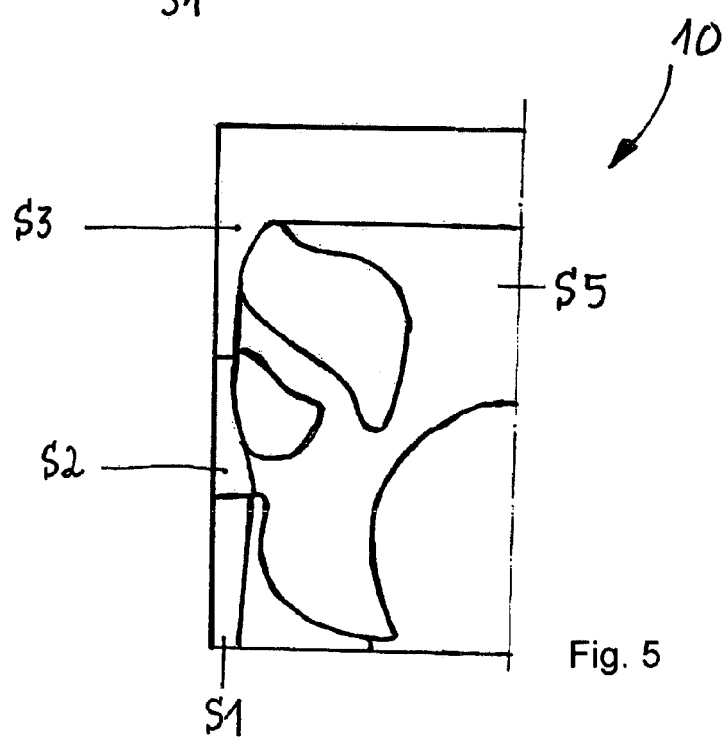
FIG. 5 is a side cross-section detail view of the piston of FIG. 1, which piston is assembled according to a second assembling embodiment.

FIG. 5 shows another embodiment of manufacturing the piston 10, and the piston 10 consists of the piston sections S1 representing the lower part of the piston skirt, the piston section S2 representing the medial part of the piston skirt and piston section S3, representing the upper part of the piston skirt and in one piece the piston head and the piston section S5, representing the piston core.

According to this embodiment the piston section S1 is weld to the piston section S2, e.g. by means of laser welding. In a next step the piston section S2 is weld to the piston section S5, e.g. by means of laser welding. Afterwards, the piston section S3 is weld to the piston section S5 by friction welding, and finally the piston section S3 is weld to the piston section S2, e.g. by laser welding. Each piston section S1 to S5 can be manufactured by forging and the piston sections S1 to S5 can be finished e.g. by cutting processes before welding.

The present invention is not limited to the embodiments described above, which are represented as examples only and can be modified in various ways within the scope of protection defined by the appending patent claims.

The invention claimed is:

1. A piston for use in a pinless connecting rod assembly in internal combustion engines or compressors, comprising:
   a piston body having an inner section defined therein;
   a cylindrical piston skirt integrally formed with and extending from said piston body and radially encircling said inner section;
   a joint claw integrally formed in said inner section of said piston body and configured to at least partially encompass a complimentary upper joining end of a connecting rod;
   at least one bar element extending between said inner section and said piston skirt, said at least one bar element separating a first open section from at least one second open section, said first and second open sections being defined between said inner section and said piston skirt.

2. The piston of claim 1, wherein said joint claw includes at least one connecting section disposed between and coupled to each of said joint claw and said piston skirt.

3. The piston of claim 1, wherein said joint claw and said bar element are configured to encase said second open section.

4. The piston of claim 2, wherein said connecting section is a flexure hinge between said joint claw and said piston skirt.

5. The piston of claim 1, wherein said at least one bar element is oriented at an angle of between about 10° to 80° with respect to a central longitudinal axis of said piston body.

6. The piston of claim 1, wherein said at least one bar element is coupled to said inner section in a transition section disposed between said joint claw and a main section of said inner section.

7. The piston of claim 2, further comprising a piston surface disposed on a top side of said piston body and configured to limit a combustion chamber of the engine, wherein with respect to a central longitudinal axis of said piston body, said first open section is disposed above said bar element, said bar element is disposed above said at least one second open section, and said second open section is disposed above said at least one connecting section.

8. The piston of claim 7, wherein said at least one bar element, said first open section, said at least one second open section, and said connecting section are each disposed between said inner section and said piston skirt on two opposite sides of said inner section.

9. The piston of claim 1, wherein said at least one bar element is configured to interact with said piston skirt and cause said piston skirt to undergo at least one of an expansion or contraction based on a mechanical load imparted to said piston body.

10. The piston of claim 1, wherein said at least one bar element is configured to interact with said piston skirt and cause a retraction of at least a portion of said piston skirt upon the application by a connecting rod of at least one of a compressive or tensile load on said piston body.

11. The piston of claim 1, wherein said at least one bar element is coupled to said piston skirt in a region between ¼H and ¾H of the piston height as measured in a downward direction, parallel to said central longitudinal axis, from a piston surface that defines a top surface of the piston body.

12. The piston of claim 1, wherein said piston body is a single piece construction having said inner section, said joint claw, said piston skirt, and said at least one bar element integrally connected thereto.

13. The piston of claim 1, wherein a recess is defined between said joint claw and a lower end of said piston skirt and is configured to decouple deformation of said joint claw occurring during operation of said piston from said piston skirt.

14. A piston-connecting rod assembly for use with a crankshaft drive for internal combustion engines or compressors, comprising:
   a connecting rod featuring a pitiless connecting rod assembly;
   a piston coupled to said connecting rod and having an inner section defined therin;
   a cylindrical piston skirt extending from said piston and radially encircling said inner section;
   a joint claw integrally formed in said inner section of said piston and configured to be coupled to, and at least partially encompass, an upper joining end of said connecting rod;
   at least one bar element extending between said inner section and said piston skirt, said at least one bar element separating a first open section in said piston from at least one second open section in said piston, said first and second open sections being defined between said inner section and said piston skirt.

* * * * *